United States Patent
Wells, Jr.

(10) Patent No.: US 12,031,609 B1
(45) Date of Patent: Jul. 9, 2024

(54) LONG REACH RATCHET BINDER

(71) Applicant: Columbus McKinnon Corporation, Getzville, NY (US)

(72) Inventor: William P. Wells, Jr., Ider, AL (US)

(73) Assignee: Columbus McKinnon Corporation, Getzville, NY (US)

( * ) Notice: Subject to any disclaimer, the term of this patent is extended or adjusted under 35 U.S.C. 154(b) by 30 days.

(21) Appl. No.: 18/126,068

(22) Filed: Mar. 24, 2023

(51) Int. Cl.
*F16G 11/12* (2006.01)

(52) U.S. Cl.
CPC ................................ *F16G 11/12* (2013.01)

(58) Field of Classification Search
CPC ................................ F16G 11/12; B60P 7/083
See application file for complete search history.

(56) References Cited

U.S. PATENT DOCUMENTS

| | | | |
|---|---|---|---|
| 535,314 A | 3/1895 | Bartlett et al. | |
| D252,555 S * | 8/1979 | Schreyer | D8/355 |
| 6,497,528 B2 * | 12/2002 | Hattan | B23P 15/00 403/44 |
| 7,055,804 B2 * | 6/2006 | Scott | B60P 7/0861 254/237 |
| 7,451,962 B1 * | 11/2008 | Kennedy | F16G 11/12 254/233 |
| 8,602,371 B2 * | 12/2013 | Shaffer | F16B 33/02 411/413 |
| 11,333,220 B2 | 5/2022 | Redder | |
| 11,371,582 B2 * | 6/2022 | Martens | B60P 7/083 |
| 11,440,458 B2 * | 9/2022 | Mollick | F16G 11/12 |
| 2014/0109361 A1 * | 4/2014 | Helline | B60P 7/083 24/68 CD |
| 2014/0326935 A1 * | 11/2014 | Chao | B60P 7/083 254/235 |
| 2017/0182927 A1 | 6/2017 | Brewster et al. | |
| 2019/0351808 A1 * | 11/2019 | Liu | F16G 11/12 |
| 2019/0351809 A1 * | 11/2019 | Liu | B60P 7/0823 |
| 2022/0111782 A1 * | 4/2022 | Scott | B60P 7/083 |
| 2022/0389988 A1 * | 12/2022 | Mollick | F16H 31/005 |

FOREIGN PATENT DOCUMENTS

WO 2022002673 A1 1/2022

* cited by examiner

*Primary Examiner* — Robert Sandy
*Assistant Examiner* — Louis A Mercado
(74) *Attorney, Agent, or Firm* — Phillips Lytle LLP; David L. Principe

(57) ABSTRACT

A ratchet binder having a main tube with internal threads at opposed open ends. The ratchet binder having a pair of semicircular threaded shafts threadably received in the opposed open ends such that when the shafts are connected by hooks to a chain and prevented from rotation, the rotation of the tube by a ratcheting mechanism causes the shafts to simultaneously move inward relative to the tube increasing tension on the opposed hooks to secure a load. A barrel divider is disposed between the shafts to keep the threads on the semicircular shafts engaged with the threads on the inside of the tube.

20 Claims, 10 Drawing Sheets

LONG REACH RATCHET BINDER

TECHNICAL FIELD

The present invention relates generally to the field of material handling, and more particularly to a mechanical device used to tighten and secure bindings such as a link chain being used to stabilize and secure heavy cargo or equipment on a cargo carrying vehicle or vessel including, but not limited to, trucks, trains, planes, and ships.

BACKGROUND ART

A standard ratchet binder as shown in FIG. 1 includes a center tube 10 that has internal left and right hand threads 28, 31 at the tube ends 34, 37. A threaded shaft 13, 16 moves into and out of each end 34, 37 of the tube 10. The ends of the shafts 13, 16 are fitted with hooks 19, 22 that hook onto respective chain ends (not shown) for securing a load and are prevented from turning. Turning of the tube 10 is achieved by a ratchet mechanism 23 (pawl 24 and ratchet gear 26) operated with a handle 25. The handle 25 is worked back and forth to turn the tube 10 relative to the shafts 13, 16 which draws the shafts 13, 16 into the tube 10 and thereby achieves tightening of the chain. The ratchet mechanism 23 can be reversed to extend the shafts 13, 16 from the tube 10 for loosening of the chain binder, again by working the handle 25 back and forth. The length of the shafts 13, 16 is limited by the travel inside the tube 10 because the opposite ends of the shafts 13, 16 eventually meet in the middle. What is needed is a ratchet binder that accommodates longer shafts for extending the reach of the ratchet binder.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a ratchet binder (99) with an internally threaded tube (100) having opposing, open ends (101, 102).

Threaded shafts (103, 112) are thread-ably inserted into the opposing open ends (101, 102) and the threads (106, 108) in the tube (100), and the threads (104, 113) on the shafts (103, 112) are adapted to provide common contraction and extension of the shafts (103, 112) relative to the tube (100) interior with the shafts (103, 112) not turning and the tube (100) turning.

The threaded shafts (103, 112) have a semi-circular profile with threads (104, 113) disposed on a curved portion (200, 202) and the threaded shafts (103, 112) have a flat side (203, 204).

A barrel divider (121) is disposed inside the tube (100). The barrel divider (121) has an elongate portion (124) configured to be disposed between the threaded shafts (103, 112) and has semicircular sections (130, 133) at opposite ends. The barrel divider (121) is disposed inside the tube (100) in facing engagement with the flat side (203, 206) of the threaded shafts (103, 112). The barrel divider (121) is configured to keep the threads (104, 113) on the threaded shafts (103, 112) engaged with the threads (106, 108) inside the tube (100) while the ends of the threaded shafts (103, 112) pass each other inside the tube (100) as best shown in FIG. 6. The barrel divider (121) is configured such that the barrel divider (121) is prevented from moving longitudinally relative to the tube (100).

A gear (105) may be fixed to the tube (100) exterior including gear teeth and a pawl and pawl housing mounted over the gear (105) and pivotal around the gear (105). The pawl selectively engages the gear teeth and prevents relative rotation of the housing in a selective one of the rotative directions.

A handle (178) extends from the pawl housing to provide leverage for an operator to pivot the housing with the pawl engaging the gear (105) of the tube (100) for forced rotation of the tube (100) relative to the shafts (103, 112).

The ratchet binder (99) may further comprise a protuberance (142) disposed at each end of the barrel divider (121).

In another aspect of the invention, the protuberance (142) extends from the semicircular section (130, 133) of the barrel divider (121).

In yet another aspect the protuberance (142) is ring-shaped.

The ratchet binder (99) may further comprise an eye (190, 193) disposed at the end of each shaft (103, 112). Alternatively, a clevis fastener (192) may also be used.

In another aspect, a hook (150, 153) is attached to the eye (190, 193).

In yet another aspect of the invention the tube (100) has left handed threads (106) at one of the opposing open ends and right handed threads (108) at the other of the opposing open ends.

In one embodiment of the invention, a center tube (100) is provided with internal left and right hand threads (106, 108). A first shaft (103) has a semicircular profile with threads (104) on the curved portion (200) and a flat surface on the straight portion (203). A second shaft (112) has a semicircular profile with threads (113) on the curved portion (202) and a flat surface on the straight portion (204). A barrel divider (121) has an elongate central portion (124) sized to fit between the first and second shafts (103, 112) and has semicircular portions (130, 133) at opposite ends (136, 139). Each semicircular portion (130, 133) has a first radius with a smooth outer surface for rotating inside the tube (100). Each semicircular portion (130, 133) may be provided with a protuberance (142) at the end with a second radius larger than the first radius. The protuberances (142) at opposed ends of the barrel divider (121) are disposed outside the tube (100) at opposite ends of the tube (100) to prevent the barrel divider (121) from moving in the longitudinal direction relative to the tube (100).

DESCRIPTION OF THE PREFERRED EMBODIMENTS

Figure 1:
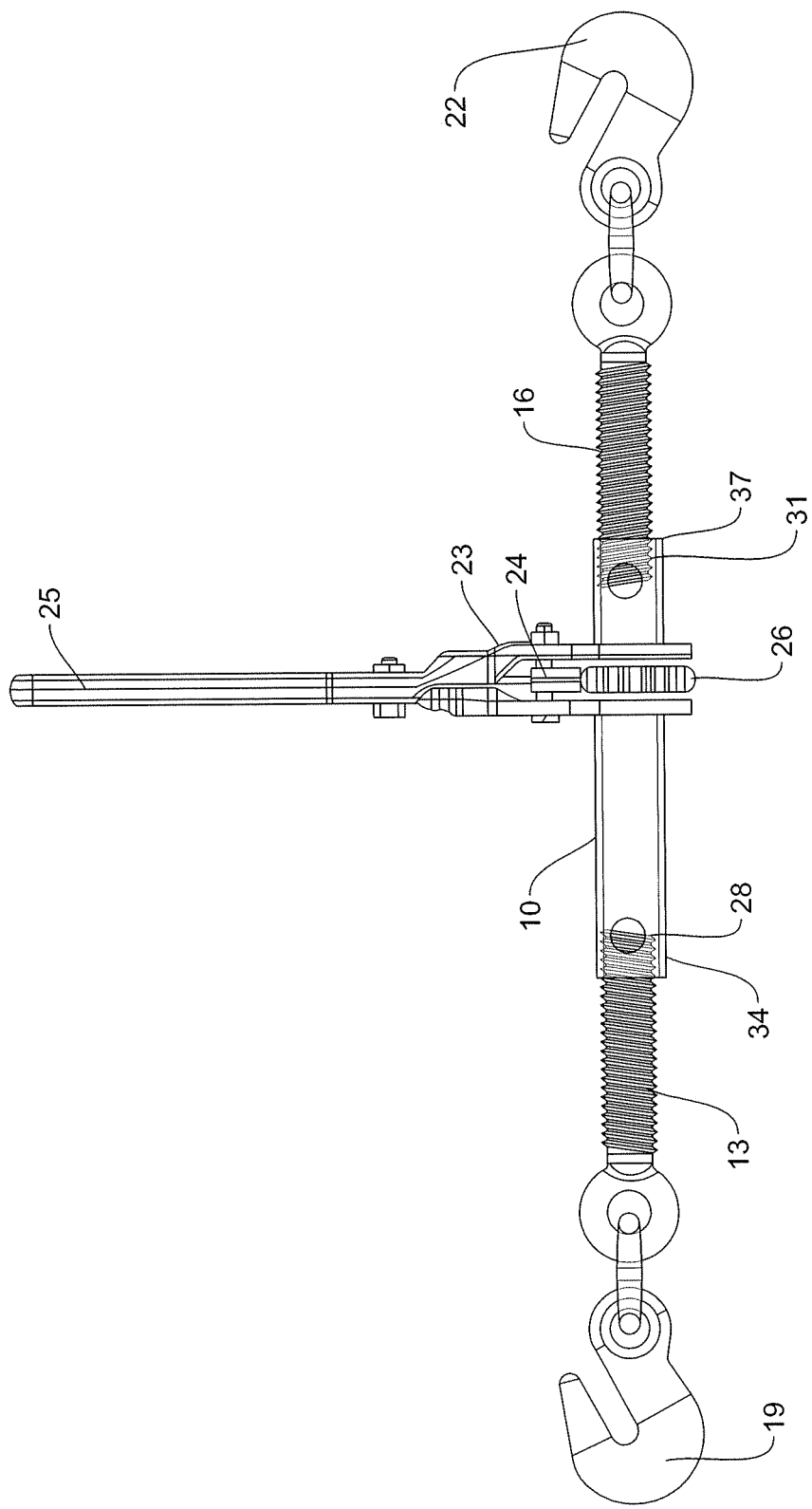
FIG. 1 is a prior art ratchet binder.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to the drawings, and more particularly to FIGS. 2-6 thereof, one embodiment of the invention provides a long reach ratchet binder 99 that includes a tube 100 with a ratchet gear 105 fixedly secured to the tube 100. Tube 100 is threaded at its inner side with left handed threads 106 on one side and right handed threads 108 on the other side. Shafts 103 and 112 (best shown in FIG. 5) are correspondingly threaded so that rotation of the tube 100 in one direction relative to both shafts 103 and 112 causes both shafts to move inwardly on threads 106, 108 respectively, and rotation of tube 100 in the opposite direction causes both shafts 103 and 112 to move outwardly on threads 106, 108. Thus with the hook ends 150, 153 prevented from rotating, e.g. as when hooked to chain links 156, 159, rotation of tube 100 produces simultaneous inner or outer movement of both shafts 103, 112.

Figure 2A:
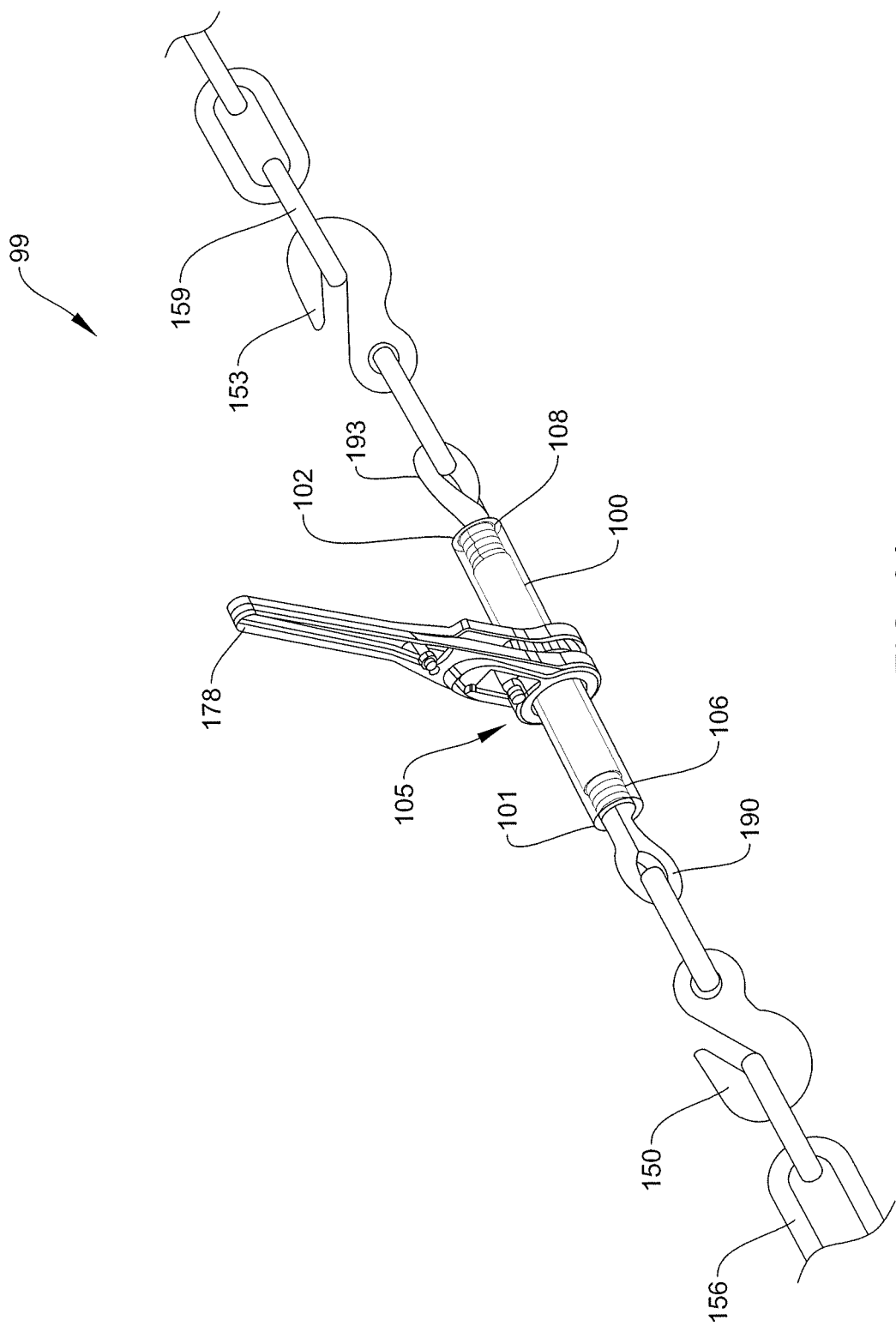
FIG. 2A is a perspective view of one embodiment of the ratchet binder of the present invention in a fully retracted position.
Figure 2B:
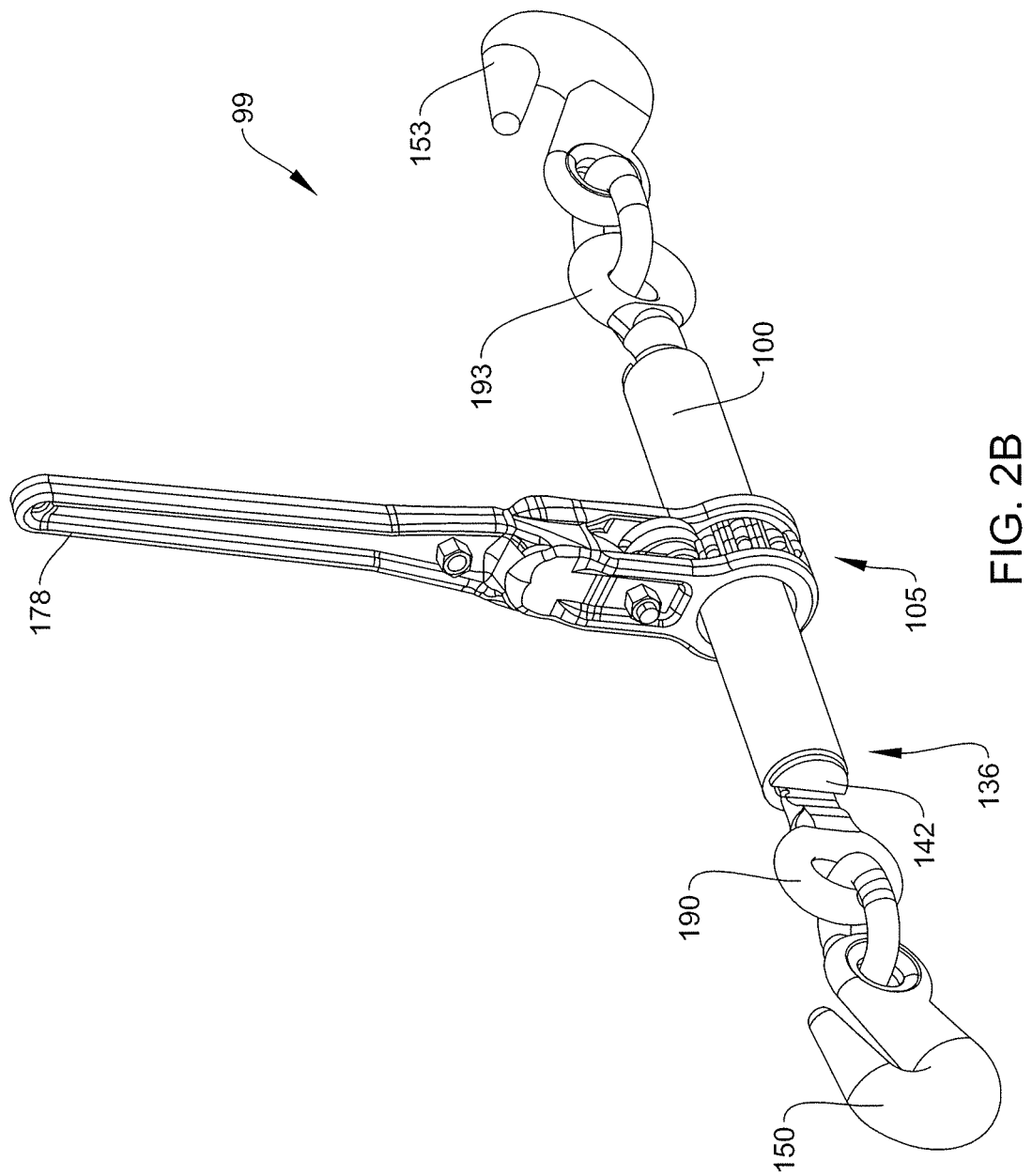
FIG. 2B is another perspective view of the ratchet binder in the fully retracted position.
Figure 2C:
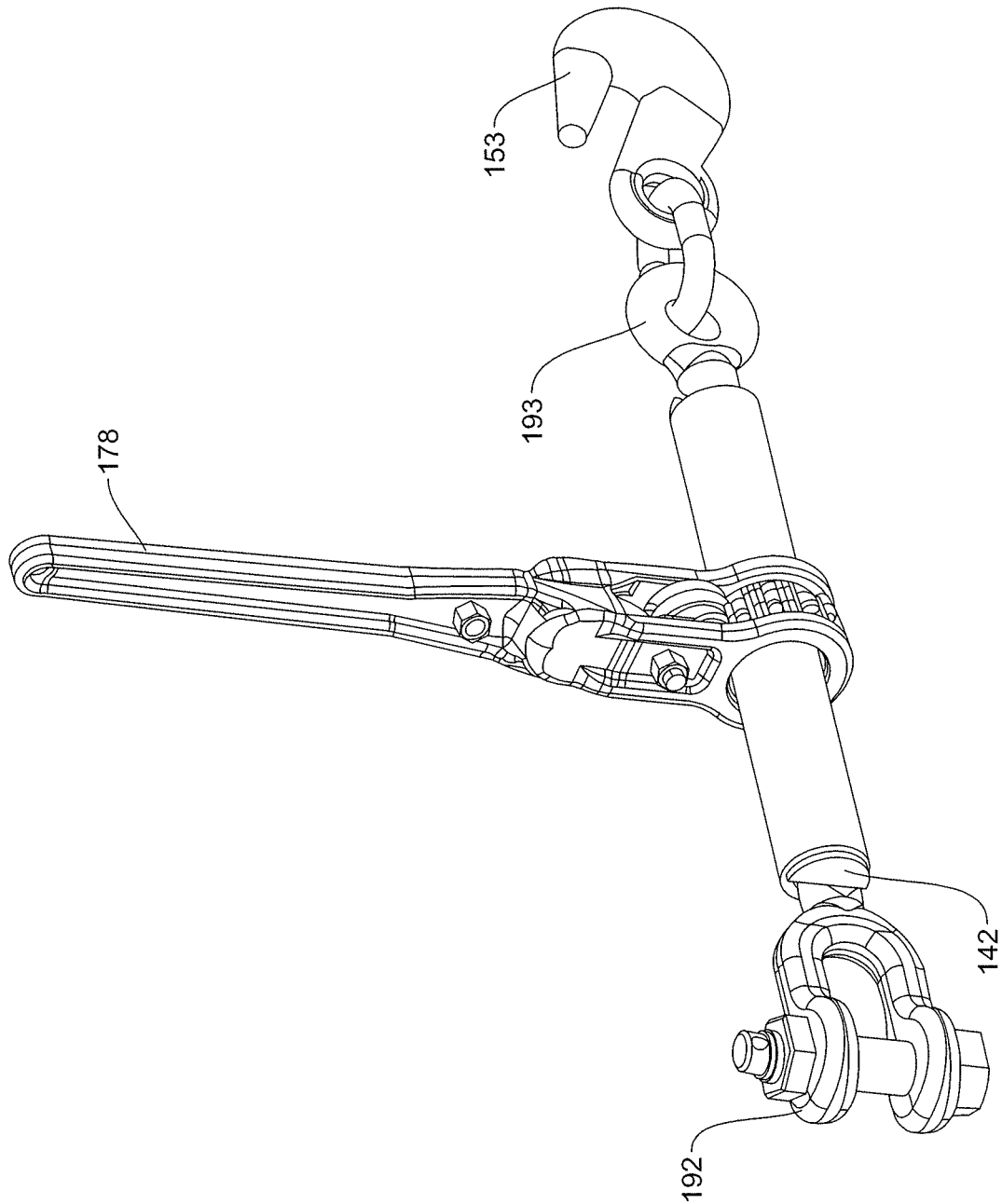
FIG. 2C is an alternate embodiment of the ratchet binder with a clevis fastener at one end.
Figure 3A:
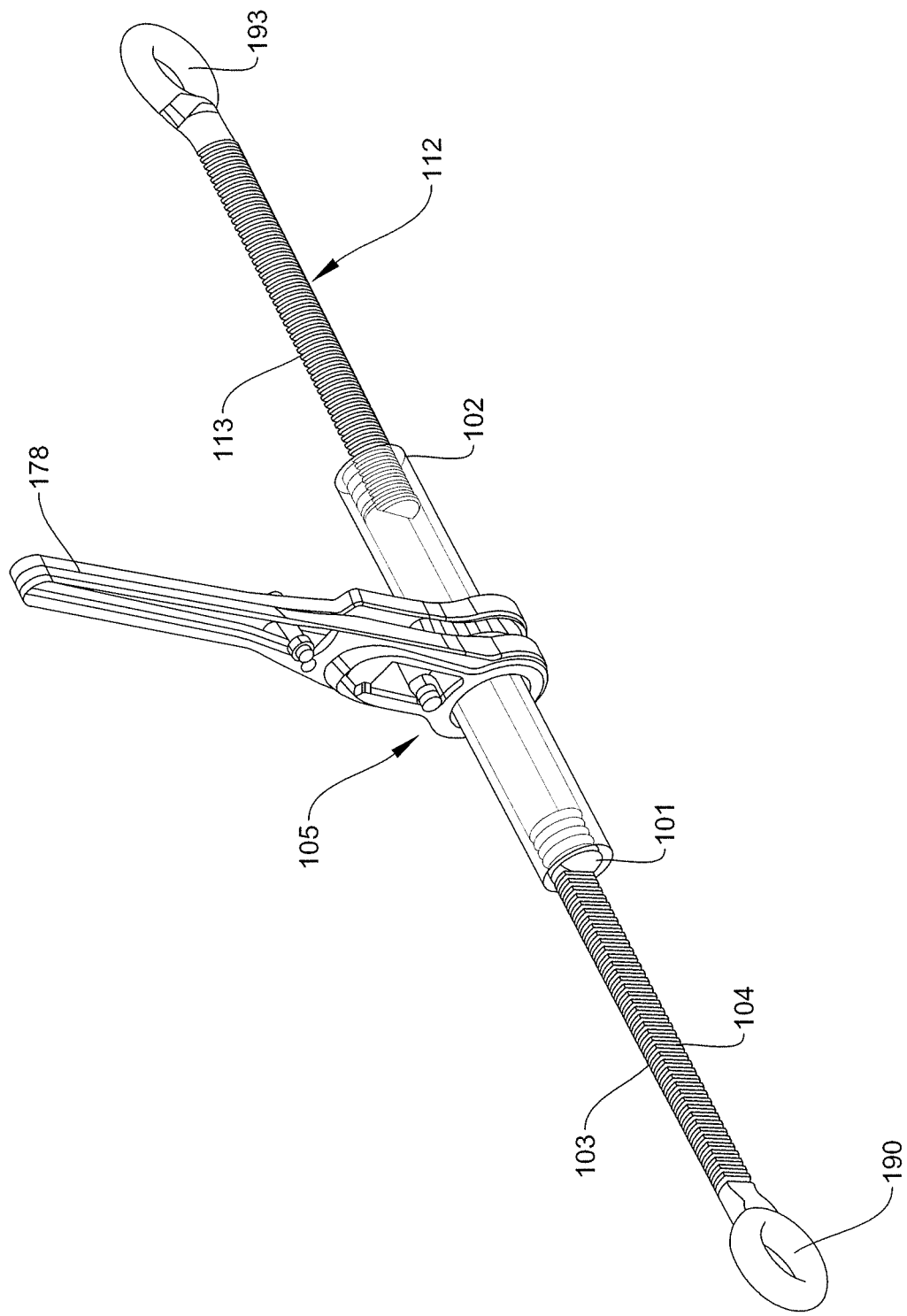
FIG. 3A is a perspective view of the ratchet binder of FIG. 2A shown in a fully extended position.
Figure 3B:
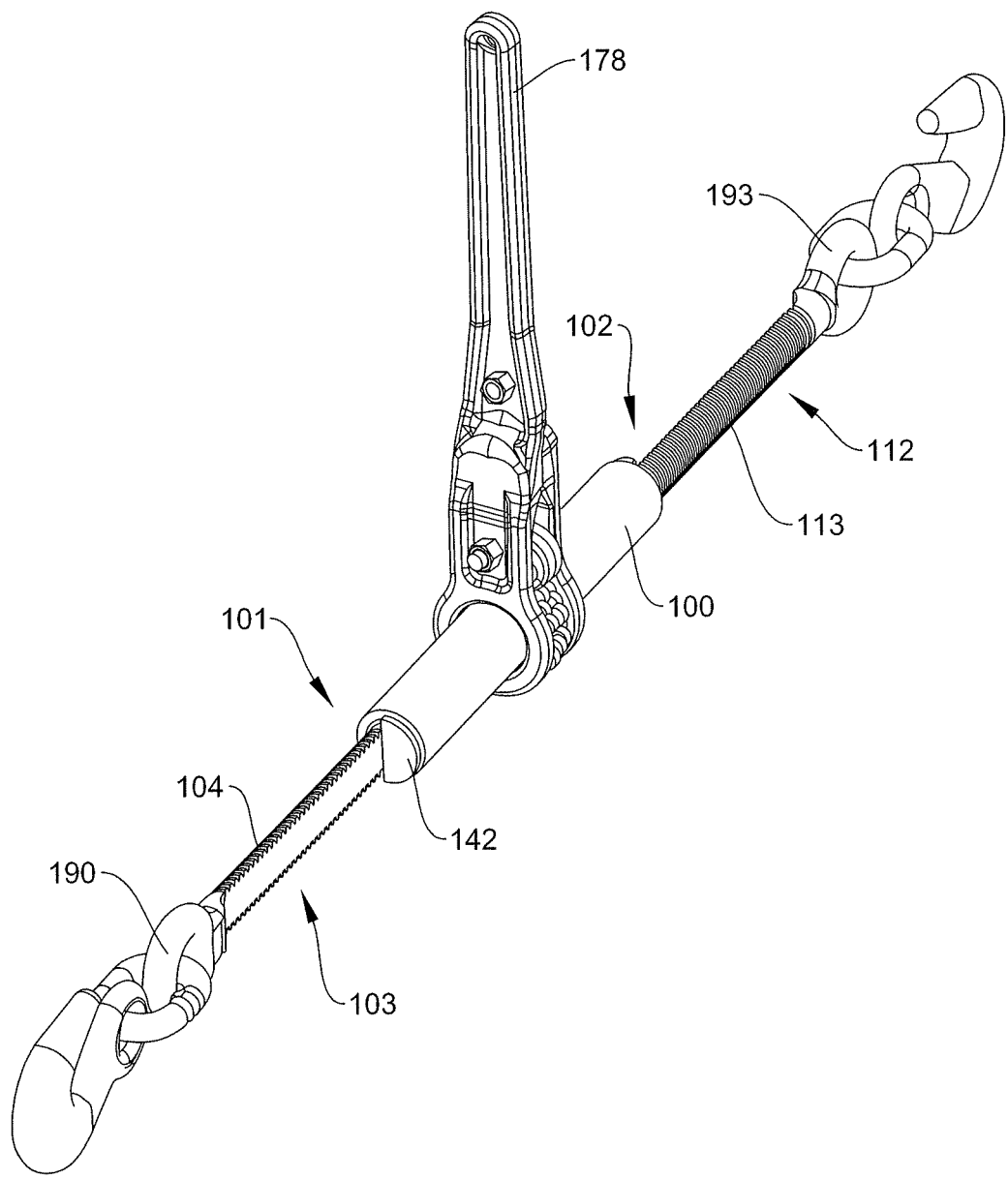
FIG. 3B is another perspective view of the ratchet binder shown in a fully extended position.
Figure 7:
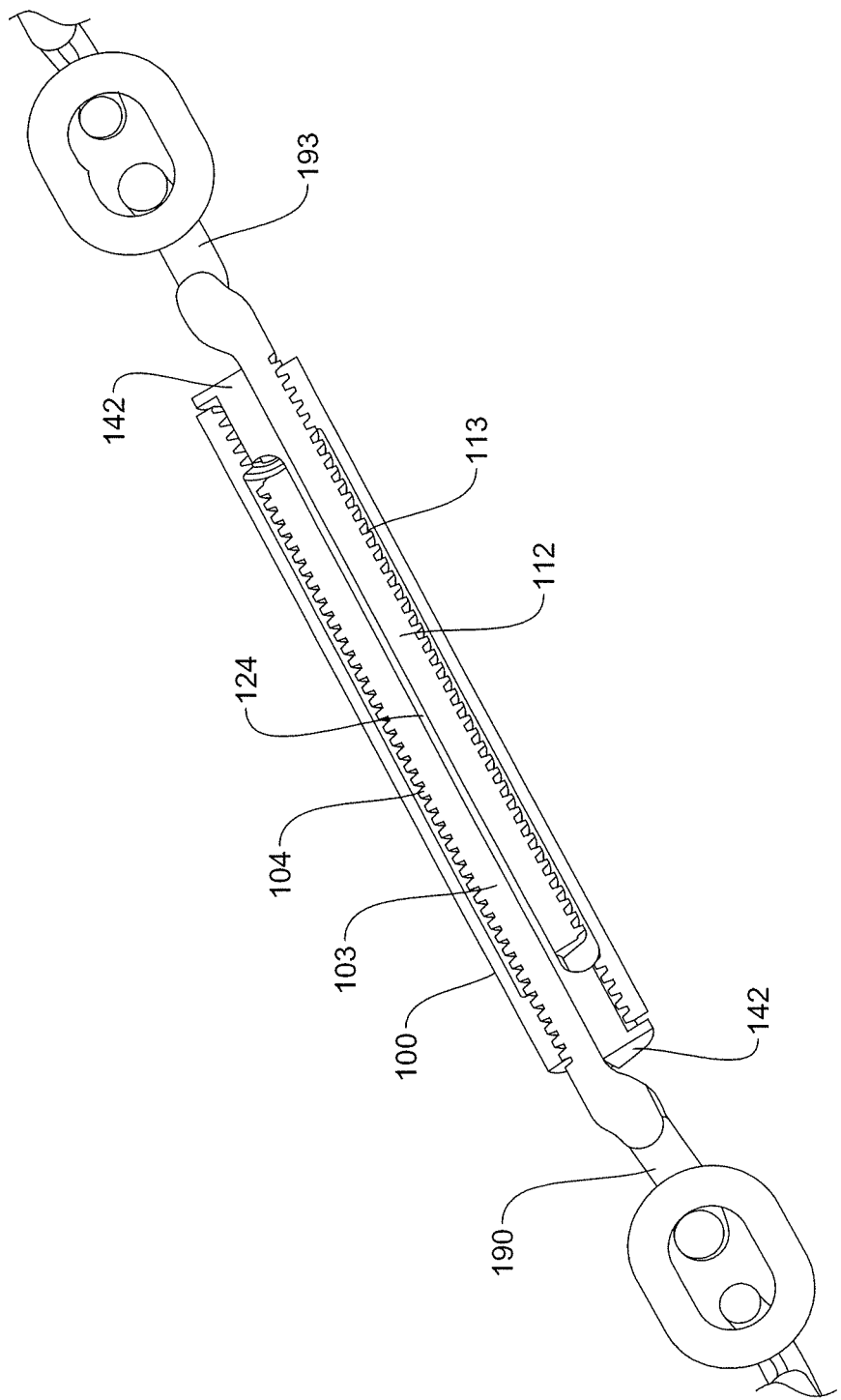
FIG. 7 is another cross-sectional view of the ratchet binder shown in FIG. 2A with the handle and ratcheting mechanism removed for clarity.

As shown in FIGS. 2A-2C and 3A-3B, the ratchet gear 105 may be fixed to the exterior surface of the tube 100. As will be evident to those of ordinary skill in the art based on this disclosure, the gear 105 may include gear teeth, a pawl, and a pawl housing mounted over the gear and pivotal around the gear. Other devices (including non-ratcheting devices) such as a simple handle or a handwheel attached to the exterior of the tube 100 or a turnbuckle configuration may also be used for rotating the tube 100 as will be evident to persons of ordinary skill in the art based on this disclosure. The ends of the shafts 103 and 112 may be provided with eyes 190, 193 (FIG. 7) for attaching hooks 150, 153. As shown in FIG. 2C, a clevis fastener 192 may also be used with the ratchet binder of the present invention.

A handle 178 extends from the pawl housing to provide leverage for an operator to pivot the pawl housing with the pawl engaging the gear 105 of the tube 100 for forced rotation of the tube 100 relative to the shafts 103, 112.

Figure 4:
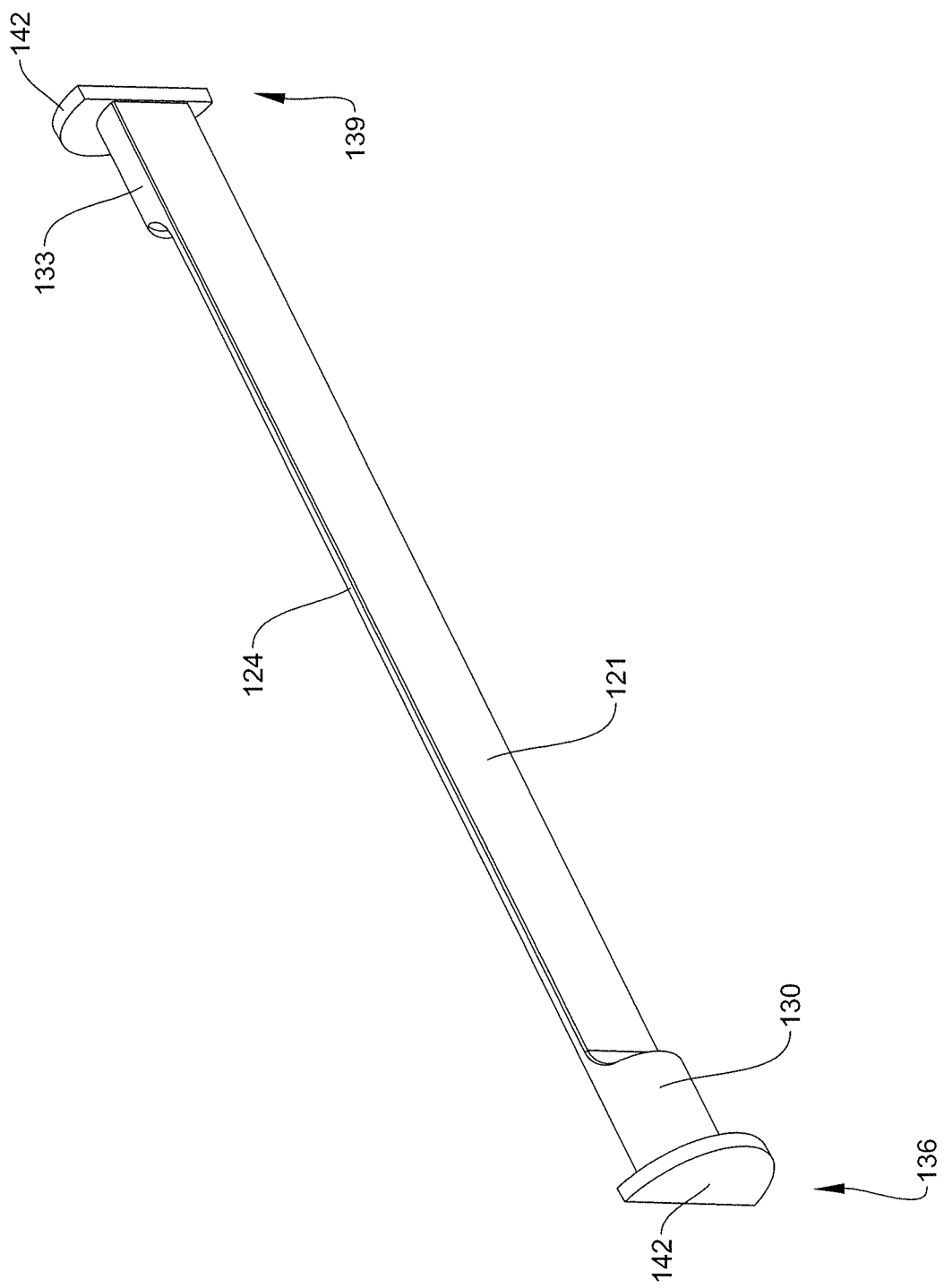
FIG. 4 is a perspective of one embodiment of the barrel divider of the present invention.
Figure 5:
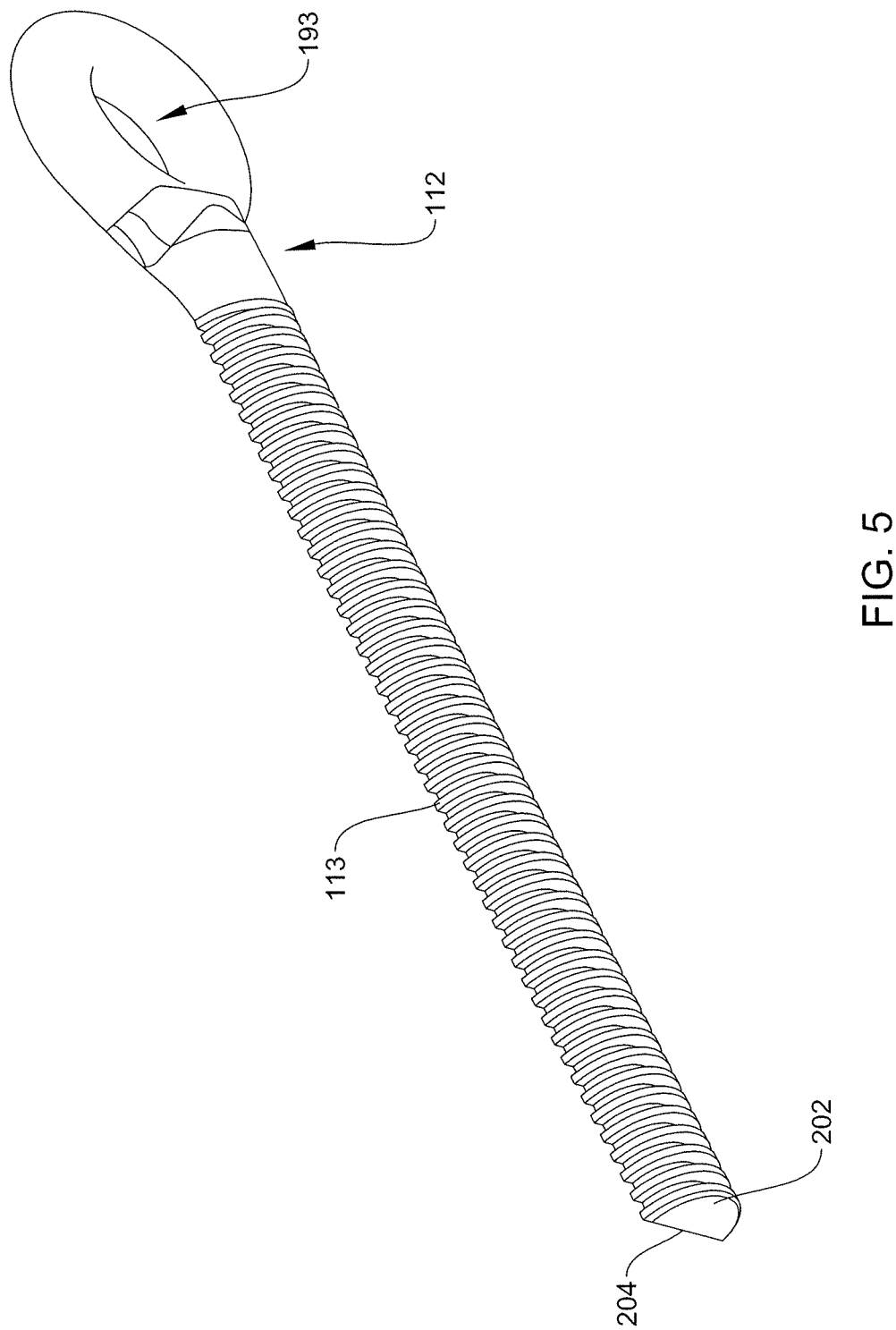
FIG. 5 is a perspective view of one embodiment of one of the threaded shafts of the present invention.

Turning to FIG. 4, the a barrel divider 121 has an elongate central portion 124 sized to fit between (best shown in FIG. 7) the first and second shafts 103, 112 and has semicircular portions 130, 133 at opposite ends 136, 139. Each semicircular portion 130, 133 has a first radius with a smooth outer surface for rotating inside the tube 100. Each semicircular portion 130, 133 may be provided with a protuberance 142 at the end with a second radius larger than the first radius of the semicircular portion 130, 133. The protuberances 142 at opposed ends of the barrel divider 121 may be disposed outside the tube 100 at opposite ends of the tube 100 to prevent the barrel divider 121 from moving in the longitudinal direction relative to the tube 100. The protuberances 142 are attached to or integral with the barrel divider 121.

Figure 6:
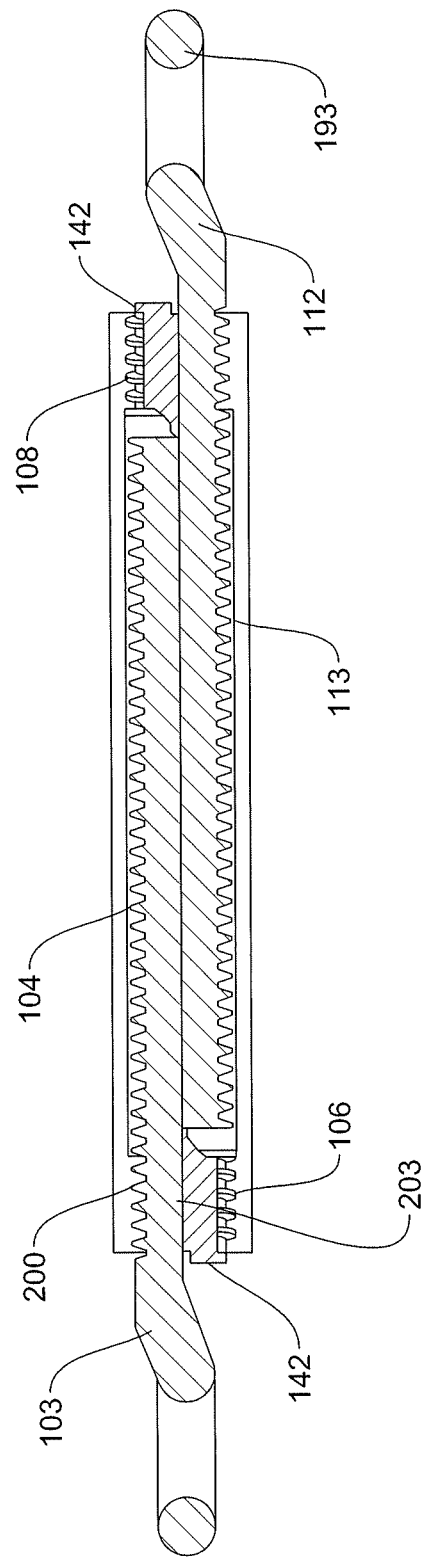
FIG. 6 is a cross-sectional view of the ratchet binder shown in FIG. 2A with the handle and ratcheting mechanism removed for clarity.

The semicircular portions 130, 133 on the barrel divider 121 are configured to keep the threads 104, 113 on the threaded shafts 103, 112 engaged with the threads 106, 108 inside the tube 100 while the ends of the threaded shafts 103, 112 pass each other inside the tube 100 (best shown in FIG. 6).

The semicircular portions 130, 133 also prevent the shafts 103, 112 from reaching the opposed threads 106, 108 at the opposite ends of the tube 100. Accordingly, the travel of the shafts 103, 112 is limited by the semicircular portions 130, 133.

The present invention contemplates that many changes and modifications may be made. Therefore, while the presently-preferred form of the long reach ratchet binder has been shown and described, and several modifications and alternatives discussed, persons skilled in this art will readily appreciate that various additional changes and modifications may be made without departing from the spirit of the invention, as defined and differentiated by the following claims.

The invention claimed is:

1. A ratchet binder comprising:
    an internally threaded tube having opposing, open ends;
    threaded shafts threadably inserted into the opposing open ends, threads in the tube and threads on the shafts adapted to provide common contraction and extension of the shafts relative to the tube interior with the shafts not turning and the tube turning, wherein the threaded shafts have a semi-circular profile with the threads disposed on a curved portion and the threaded shafts having a flat side;
    a barrel divider disposed inside the tube, the barrel divider having an elongate portion configured to be disposed between the threaded shafts and having semicircular sections at opposite ends, the barrel divider disposed inside the tube in facing engagement with the flat side of the threaded shafts, the barrel divider configured to keep the threads on the threaded shafts engaged with the threads inside the tube while ends of the threaded shafts pass each other inside the tube;
    a gear fixed to the tube exterior including gear teeth and a pawl and pawl housing mounted over the gear and pivotal around the gear, said pawl selectively engaging the gear teeth and preventing relative rotation of the housing in a selective one of rotative directions; and,
    a handle extended from said housing to provide leverage for an operator to pivot the housing with the pawl engaging the gear of the tube for forced rotation of the tube relative to the shafts.

2. The ratchet binder of claim 1, further comprising a protuberance disposed at each of the ends of the barrel divider.

3. The ratchet binder of claim 2, wherein the protuberance extends from the semicircular section of the barrel divider.

4. The ratchet binder of claim 2, wherein the protuberance is ring-shaped.

5. The ratchet binder of claim 1, further comprising an eye disposed at the end of each of the shafts.

6. The ratchet binder of claim 5, wherein a hook is attached to the eye.

7. The ratchet binder of claim 1, wherein the tube has left handed threads at one of the opposing open ends and right handed threads at the other of the opposing open ends.

8. The ratchet binder of claim 1, wherein the barrel divider is configured such that the barrel divider is prevented from moving longitudinally relative to the tube.

9. A ratchet binder comprising:

an internally threaded tube having opposing, open ends;

threaded shafts threadably inserted into the opposing open ends and threads in the tube and on the shafts adapted to provide common contraction and extension of the shafts relative to the tube interior with the shafts not turning and the tube turning, wherein the threaded shafts have a semi-circular profile with the threads disposed on a curved portion and the threaded shafts having a flat side;

a barrel divider disposed inside the tube, the barrel divider having an elongate portion configured to be disposed between the threaded shafts and having semicircular sections at opposite ends, the barrel divider disposed inside the tube in facing engagement with the flat side of the threaded shafts, the barrel divider configured to keep the threads on the threaded shafts engaged with the threads inside the tube while ends of the threaded shafts pass each other inside the tube, the barrel divider configured such that the barrel divider is prevented from moving longitudinally relative to the tube; and, means for rotating the tube.

10. The ratchet binder of claim 9, further comprising a protuberance disposed at each of the ends of the barrel divider.

11. The ratchet binder of claim 10, wherein the protuberance extends from the semicircular section of the barrel divider.

12. The ratchet binder of claim 10, wherein the protuberance is ring-shaped.

13. The ratchet binder of claim 9, further comprising an eye disposed at the end of each of the shafts.

14. The ratchet binder of claim 13, wherein a hook is attached to the eye.

15. The ratchet binder of claim 9, wherein the tube has left handed threads at one of the opposing open ends and right handed threads at the other of the opposing open ends.

16. A ratchet binder comprising:

an internally threaded tube having opposing, open ends;

threaded shafts threadably inserted into the opposing open ends and threads in the tube and on the shafts adapted to provide common contraction and extension of the shafts relative to the tube interior with the shafts not turning and the tube turning, wherein the threaded shafts have a semi-circular profile with the threads disposed on a curved portion and the threaded shafts having a flat side;

a barrel divider disposed inside the tube, the barrel divider having an elongate portion configured to be disposed between the threaded shafts and having semicircular sections at opposite ends, the barrel divider disposed inside the tube in facing engagement with the flat side of the threaded shafts, the barrel divider configured to keep the threads on the threaded shafts engaged with the threads inside the tube while ends of the threaded shafts pass each other inside the tube, the barrel divider having protuberances extending from the semicircular sections at the opposite ends, the protuberances disposed outside the tube and configured such that the barrel divider is prevented from moving longitudinally relative to the tube;

a gear fixed to the tube exterior including gear teeth and a pawl and pawl housing mounted over the gear and pivotal around the gear, said pawl selectively engaging the gear teeth and preventing relative rotation of the housing in a selective one of rotative directions;

and a handle extended from said housing to provide leverage for an operator to pivot the housing with the pawl engaging the gear of the tube for forced rotation of the tube relative to the shafts.

17. The ratchet binder of claim 16, wherein the protuberance is ring-shaped.

18. The ratchet binder of claim 16, further comprising an eye disposed at the end of each of the shafts.

19. The ratchet binder of claim 18, wherein a hook is attached to the eye.

20. A mechanical device comprising:

an internally threaded tube having opposing, open ends;

threaded shafts threadably inserted into the opposing open ends, threads in the tube and the threads on the shafts adapted to provide common contraction and extension of the shafts relative to the tube interior with the shafts not turning and the tube turning, wherein the threaded shafts have a semi-circular profile with threads disposed on a curved portion and the threaded shafts having a flat side; and, a barrel divider disposed inside the tube, the barrel divider having an elongate portion configured to be disposed between the threaded shafts and having semicircular sections at opposite ends, the barrel divider disposed inside the tube in facing engagement with the flat side of the threaded shafts, the barrel divider configured to keep the threads on the threaded shafts engaged with the threads inside the tube while ends of the threaded shafts pass each other inside the tube.

* * * * *